CONTACT ONE CAPACITOR ELECTRODE WITH AND ISOLATE ANOTHER FROM AN ELECTROLYTE

↓

MAKE ISOLATED ELECTRODE THE ANODE

↓

APPLY VOLTAGE BETWEEN ANODE AND ELECTROLYTE nited States Patent Office 3,517,277
Patented June 23, 1970

3,517,277
METHOD AND CAPACITOR WITH ELECTRODE AREAS OVER WEAK DIELECTRIC AREAS REMOVED
Ernest N. Urfer and Salvatore J. Acello, North Adams, Mass., and David W. Collins, State College, Pa., assignors to Sprague Electric Company, North Adams, Mass., a corporation of Massachusetts
Filed Oct. 25, 1967, Ser. No. 678,078
Int. Cl. H01g *3/075; 9/05*
U.S. Cl. 317—230          12 Claims

ABSTRACT OF THE DISCLOSURE

Decreasing the D.C. leakage current and improving the breakdown potential of capacitors by electrolytically deplating electrode areas which overlie dielectric regions having a comparatively low dielectric strength.

BACKGROUND OF THE INVENTION

This invention relates to a process for decreasing the D.C. leakage current and improving the breakdown potential of capacitors and to the so-improved capacitors.

Poor yields are commonly experienced in the manufacture of valve metal/valve metal oxide/metal counterelectrode capacitors. Apparently the dielectric valve metal oxide layer is formed with weak regions or with fine cracks. These regions or fine cracks are points of comparatively low dielectric strength which become covered by the counterelectrode of the capacitor. When the unit is operated at or about its rated voltage one or more shorts are observed between electrode areas overlying these regions of comparatively low dielectric strength. Elimination or minimizing of this problem would constitute a significant advance in the art.

SUMMARY OF THE INVENTION

It is an object of the invention to present a process for decreasing the D.C. leakage current of capacitors.

It is a further object to present a process for improving the breakdown potential of capacitors.

It is yet another object to present a new capacitor having an improved breakdown potential and a comparatively low leakage current.

This invention relates to a process for decreasing the D.C. leakage current and improving the breakdown potential of capacitors having a dielectric with regions of comparatively low dielectric strength comprising: (1) contacting at least one capacitor electrode with and isolating another from an electrolyte; (2) making the isolated electrode the anode of the system; and (3) applying a voltage between the anode and the electrolyte which is less than the formation voltage of the dielectric but more than the breakdown voltage of said dielectric regions having comparatively low dielectric strength so as to remove specific capacitor electrode areas which overlie said regions.

The present invention is based upon the theory that capacitor counterelectrode areas overlying dielectric regions which have a comparatively low dielectric strength, can be removed by immersing the counterelectrode into an electrolyte and impressing a voltage stress across these regions. In the instant process, the electrode which is made the anode of the system, must be isolated from the electrolyte in order to prevent anode dissolution in the electrolyte. This isolation is accomplished in various ways. When using, for example, a valve metal as the anode, the dielectric of the capacitor will be the oxide of the valve metal and this oxide will isolate the anode from the electrolyte. In this case the entire capacitor can be immersed in the electrolyte without any anode dissolution occurring.

In the instance where the anode is not protected by its own dielectric oxide surface, then it must be coated with some insulating material to isolate it from the electrolyte or it must be kept out of contact with the electrolyte during the process. In the former situation the anode can be coated with lacquer, organic polymer, etc. In the latter situation the capacitor could be floated on the electrolyte with the counterelectrode in contact with the electrolyte and the anode outside of the electrolyte. In this manner the anode would be isolated from the electrolyte. Thus, only the counterelectrode, which is to be electrolytically cleared from dielectric regions of low dielectric strength, makes direct contact with the electrolyte.

The invention also relates to a capacitor comprising two or more electrodes each separated by a dielectric layer, at least one electrode having holes which overlie dielectric regions having a comparatively low dielectric strength. At least one electrode is a valve metal electrode and the dielectric of the capacitor is a valve metal oxide. In a specific embodiment of the capacitor one electrode is tantalum, the dielectric is a tantalum oxide, and the counterelectrode is nickel, said nickel having holes overlying tantalum oxide regions of comparatively low dielectric strength.

In general, the capacitors are first produced by any prior art process and thereafter at least one electrode of the capacitor is contacted with an electrolyte according to the subject process. Another electrode of the capacitor is isolated from the electrolyte. As indicated above, isolation is accomplished by either coating the electrode with dielectric which will permit sumersion of this electrode in the electrolyte or by keeping the non-insulated electrode out of contact with the electrolyte. The insulated electrode is made the anode of the system and a separate inert cathode electrode is immersed in the electrolyte. It is preferred that a voltage greater than the rated surge voltage of the capacitor is applied to the system for a time sufficient to remove capacitor counterelectrode areas overlying any dielectric region having a comparatively low dielectric strength. The applied clearing voltage is usually from ⅕ to ¾ the dielectric formation voltage. The voltage can be applied gradually or all at once. Small counterelectrode areas are removed by "blow-out" and/or deplating at weak regions in the dielectric. By this is meant that regions of comparatively low dielectric strength can not withstand the voltage stress and a low resistance path occurs between the capacitor anode and the counterelectrode. The action of the high current density can explode away the dielectric and counterelectrode areas overlying the exploding dielectric and/or deplate the metal from regions of low resistance.

BRIEF DESCRIPTION OF THE DRAWING

This invention is illustrated by the accompanying drawing in which.

DETAILED DESCRIPTION OF THE INVENTION

Example

Figures 1, 2:
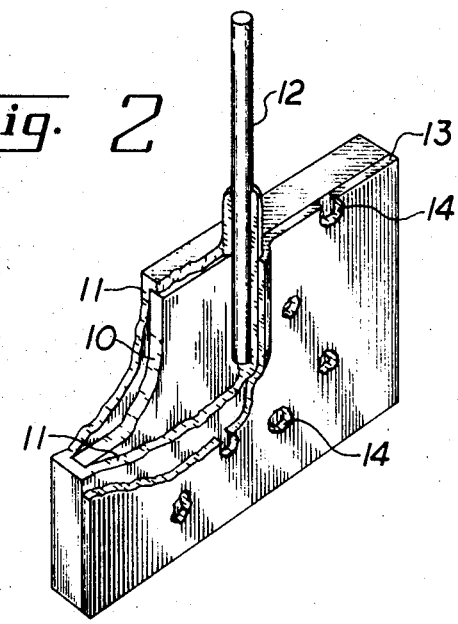
FIG. 1 is a flow sheet of the process of the present invention and FIG. 2 is a perspective view of a partly-broken-away capacitor formed by said process. Referring to the drawing, electrode 10 is of a valve metal and is the anode of the capacitor. A valve metal oxide layer 11 covers the entire surface of electrode 10 and part way up the surface of anode lead 12. A counterelectrode 13 is deposited over valve metal oxide 11. The process includes the following steps shown in the flow sheet of FIG. 1: the capacitor is immersed in an electrolyte and electrode 10 is made the anode. An inert electrode (not shown) is also immersed in the electrolyte. A voltage greater than the rated surge voltage is applied between the anode and the electrolyte for a time sufficient to result in cleared regions 14.

A tantalum foil about 3 x 4 inches was formed electrolytically to about 250 volts. A pattern of about eighty ¼ inch squares of nickel was deposited by electroless deposition on one side of the tantalum oxide coated tantalum foil. This arrangement was immersed into a LiCl electrolyte (0.6 M) having 4 g./l. of $H_3BO_3$. A separate tantalum cathode was immersed into the electrolyte to complete the system. The oxide coated tantalum was made the anode and a voltage of about 100 volts was applied for a period of about 10 minutes. Under microscopic examination, each nickel area showed an average of about 3 to 4 pinhole areas where nickel had been removed.

The nickel was removed from areas overlying tantalum oxide regions of comparatively low dielectric strength. Prior to the clearing of the individual capacitors by the process of the present invention, the individual capacitors were tested for leakage current and 53% of the capacitors had a leakage current below $0.099\mu a$. After subjecting the same capacitors to the clearing technique of this example, 92% of the capacitors had a leakage current below $0.099\mu a$. In order to complete the capacitors for ultimate use, the unit was cut up into eighty individual capacitors and lead wires were attached to the nickel counterelectrode and the tantalum electrode. Each unit was then suitably encased in a protective covering.

Instead of a single pattern of about eighty ¼ inch squares of nickel deposited on one side of the anodized tantalum foil, a second pattern can be deposited on the other side of the anodized foil. Dielectric regions of comparatively low dielectric strength would be cleared exactly as in the preceeding example. As an example of applying electrode contacts, and separating the indiviudal capacitors, reference is made to co-pending patent application, Ser. No. 635,443, filed May 2, 1967 in the name of Henry J. Puppolo et al. Employing the technique of this co-pending application, an insulative layer is bonded to both planar surfaces of the unit. Each insulative layer will have a number of apertures corresponding to the number of electrodes on each planar surface. In this case the number of apertures would be eighty on each side. The layers are bonded in place by any suitable adhesive. A conductive material is deposited within each aperture so as to make contact to the nickel electrodes. The structure is then cut between each electrode to provide individual capacitor units. This technique provides a substantial leadless device having large plates which extend over the full planar surface of the component.

The counterelectrodes contemplated herein can be any known electrode metal, e.g. nickel, silver, copper, etc. For the purposes of the present invention carbon, deposited via a liquid suspension thereof, e.g. Aquadag, may be considered as equivalent to a metal electrode.

It will be obvious to those skilled in the art that the effectiveness of the instant process is, to some extent, dependent upon the thickness of the counterelectrode. If it is too thick, the low dielectric strength area cannot be cleared without destroying a comparatively large region. Thus, the experienced investigator will deposit only sufficient counterelectrode to insure electrode continuity with no unnecessary buildup.

The contemplated electrolytes include all prior art electrolytes and in particular anodic oxide film forming electrolytes.

Typical examples of capacitors within the scope of the present invention are the valve metal capacitors such as tantalum, niobium, hafnium, titanium and aluminum capacitors. The scope of the invention also extends to metallized dielectric film capacitors such as metallized paper and metallized organic polymer films.

While the present process has been illustrated as improving a completed capacitor, it is to be understood that the process can be carried out while the capacitor is being formed, for example, while the counterelectrode is being applied to the dielectric of the capacitor. For instance, the nickel counterelectrode of the specific example herein was applied by plating from a typical prior art electrolyess nickel plating solution. During the plating process the clearing voltage of the present invention can be applied in order to clear areas of comparatively low dielectric strength, while at the same time nickel is being plated on areas of comparatively high dielectric strength.

Since it is obvious that many modifications and changes may be made in the above-described details without departing from the spirit and scope of the invention, it is to be understood that the invention is not limited to said details except as set forth in the appended claims.

What is claimed is:

1. A method for decreasing the D.C. leakage current and improving the breakdown potential of capacitors having an anode electrode, a cathode electrode and an anodic oxide dielectric therebetween, said dielectric having regions of comparatively low dielectric strength, comprising: (1) contacting at least one cathode electrode with an electrolyte while isolating the corresponding anode electrode therefrom; (2) contacting said electrolyte with another electrode; and (3) applying a voltage, between said anode and the electrolyte, which is less than the formation voltage of said oxide dielectric but more than the breakdown voltage of said regions for removing the cathode electrode in the areas which overlie said regions.

2. The method of claim 1 wherein the isolated anode electrode is an anodized valve metal electrode.

3. The method of claim 2 wherein the anode is tantalum, aluminum, hafnium, titanium or niobium.

4. The method of claim 3 wherein said at least one cathode electrode is nickel.

5. The method of claim 4 wherein the electrolyte is an anodic film-forming electrolyte.

6. The method of claim 5 wherein the voltage is greater than the surge voltage of said capacitor.

7. The method of claim 5 wherein said voltage is from about ⅓ to ¾ the anodization voltage of the anodized electrode.

8. The method of claim 7 wherein the isolated electrode is a tantalum foil isolated by a tantalum oxide film electrolytically formed thereon, and wherein a plurality of discrete nickel cathode electrodes are deposited on at least one surface of the oxide coated tantalum foil, and wherein said electrolyte is a LiCl electrolyte.

9. The method of claim 8 wherein a plurality of discrete nickel electrodes are deposited on both surfaces of the oxide coated tantalum foil.

10. A capacitor comprising a film forming metal anode and a metal cathode, said anode having a dielectric oxide film on its surface separating the cathode from the anode, said cathode being disposed on the surface of and overlying said dielectric film, the dielectric film having regions of comparatively low dielectric strength relative to other portions thereof, said metal cathode being cleared from the surface of said dielectric film in said regions of comparatively low dielectric strength, said cleared regions being holes in said metal cathode, electrolytically produced by a voltage greater than the breakdown voltage of said regions of comparatively low breakdown strength.

11. The capacitor of claim 10 wherein said anode is tantalum, said dielectric film is tantalum oxide, and said cathode is nickel.

12. The capacitor of claim 10 wherein said anode is tantalum, said dielectric film is tantalum oxide and a pair of nickel cathode counterelectrodes oppose one another on the said dielectric film.

References Cited

UNITED STATES PATENTS

| 1,337,245 | 4/1920 | MacPherson | 317—258 X |
| 2,171,127 | 8/1939 | Kohman | 317—258 X |
| 3,239,731 | 3/1966 | Matovich | 317—258 |

JAMES D. KALLAM, Primary Examiner

U.S. Cl. X.R.

29—570; 317—233